United States Patent
Sohn et al.

(10) Patent No.: US 12,242,091 B2
(45) Date of Patent: Mar. 4, 2025

(54) OPTICAL PATH CONTROL MEMBER AND DISPLAY DEVICE COMPRISING SAME

(71) Applicant: LG INNOTEK CO., LTD., Seoul (KR)

(72) Inventors: Dong Woo Sohn, Seoul (KR); Kweon Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 511 days.

(21) Appl. No.: 17/631,340

(22) PCT Filed: Jul. 21, 2020

(86) PCT No.: PCT/KR2020/009598
§ 371 (c)(1),
(2) Date: Jan. 28, 2022

(87) PCT Pub. No.: WO2021/020797
PCT Pub. Date: Feb. 4, 2021

(65) Prior Publication Data
US 2022/0283346 A1    Sep. 8, 2022

(30) Foreign Application Priority Data

Jul. 30, 2019 (KR) .......................... 10-2019-0092485

(51) Int. Cl.
*G02B 5/24* (2006.01)
*G06F 1/16* (2006.01)

(52) U.S. Cl.
CPC .............. *G02B 5/24* (2013.01); *G06F 1/1603* (2013.01)

(58) Field of Classification Search
CPC ................................ G02B 5/24; G06F 1/1603
(Continued)

(56) References Cited

U.S. PATENT DOCUMENTS

| 2013/0264728 A1 | 10/2013 | Myoung et al. |
| 2014/0071653 A1 | 3/2014 | Thompson et al. |
| 2021/0373403 A1 | 12/2021 | Kim et al. |

FOREIGN PATENT DOCUMENTS

| CN | 103443699 A | 12/2013 |
| CN | 103502855 A | 1/2014 |

(Continued)

OTHER PUBLICATIONS

Office Action dated Mar. 23, 2023 in Chinese Application No. 202080054680.9.

(Continued)

*Primary Examiner* — Jerry L Brooks
(74) *Attorney, Agent, or Firm* — Saliwanchik, Lloyd & Eisenschenk

(57) ABSTRACT

An optical path control member according to an embodiment comprises: a first substrate; a first electrode disposed on the first substrate; a second substrate disposed on the first substrate; a second electrode disposed beneath the second substrate; and a light conversion unit disposed between the first electrode and the second electrode, wherein the light conversion unit includes partition wall parts and accommodation parts that are alternately disposed, the accommodation part has a light transmission rate that varies according to the application of voltage, and the accommodation part has a first width defined as a narrow width and a second width defined as a wide width, and the partition wall part has a third width defined as a wide width, the height of the partition wall part or the accommodation part is defined, and the ratio (the second width/the first width of the second width to the first width is less than or equal to 1.8.

14 Claims, 10 Drawing Sheets

(58) Field of Classification Search
USPC .......................................................... 359/630
See application file for complete search history.

(56) References Cited

FOREIGN PATENT DOCUMENTS

| KR | 10-2008-0080862 A | 9/2008 |
| KR | 10-2012-0089520 A | 8/2012 |
| KR | 10-2015-0125051 A | 11/2015 |
| KR | 10-2016-0096263 A | 8/2016 |
| KR | 10-2018-0004879 A | 1/2018 |
| KR | 20180004879 A * | 1/2018 ........... G02F 1/1333 |
| KR | 10-2020-0028078 A | 3/2020 |

OTHER PUBLICATIONS

International Search Report dated Nov. 5, 2020 in International Application No. PCT/KR2020/09598.
Supplementary European Search Report dated Jul. 4, 2023 in European Application No. 20846753.0.

* cited by examiner

LIGHT BLOCKING MODE

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2020/009598, filed Jul. 21, 2020, which claims the benefit under 35 U.S.C. § 119 of Korean Application No. 10-2019-0092485, filed Jul. 30, 2019, the disclosures of each of which are incorporated herein by reference in their entirety.

TECHNICAL FIELD

An embodiment relates to an optical path control member capable of switching, and to a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may control the movement path of light, block light in a specific direction, and transmit light in a specific direction.

Meanwhile, such a light-shielding film may be applied to a display device such as a navigation device or a vehicle dashboard in a movement means such as a vehicle. That is, the light-shielding film may be applied to various fields in accordance with various purposes.

In addition, the light-shielding film may be used in various environments of the user. For example, the light-shielding film may be used during the day or night, and may be applied in various environments, such as when the user requires a specific viewing angle or improved visibility.

However, since light transmittance of a light blocking pattern of the light-shielding film is fixed, the user may be restricted in using the light-shielding film in various environments.

Therefore, there is a need for an optical path control member having a new structure that may be applied in various use environments.

DISCLOSURE

Technical Problem

An embodiment is directed to providing an optical path control member that is driven in another mode according to application of a voltage and a display device including the same.

Technical Solution

An optical path control member according to an embodiment includes: a first substrate; a first electrode disposed on the first substrate; a second substrate disposed on the first substrate; a second electrode disposed under the second substrate; and a light conversion unit disposed between the first electrode and the second electrode, wherein the light conversion unit includes a partition wall part and an accommodation part alternately disposed, the accommodation part changes light transmittance according to application of a voltage, the accommodation part is defined with a first width defined as a narrow width and a second width defined as a wide width, the partition wall part is defined with a third width defined as a wide width, a height of the partition wall part or the accommodation part is defined, and a ratio (second width/first width) of the second width to the first width is 1.8 or less.

Advantageous Effects

An optical path control member according to an embodiment can include a light conversion unit in which light transmittance is changed according to application of a voltage. That is, the light conversion unit can include an accommodation part in which the light transmittance changes according to application of a voltage and light absorbing particles are accommodated That is, when a voltage is not applied, an accommodation part of a light conversion unit of the optical path control member according to the embodiment can be driven as a light blocking part, and when the voltage is applied, the accommodation part can be driven as a light transmitting part.

Accordingly, the optical path control member according to the embodiment can be applied in various ways according to a user's usage environment.

In addition, a width of the accommodation part can be widened while the accommodation part of the optical path control member according to the embodiment extends from a light incident part toward a light emitting part. Further, when the voltage is applied, since the light absorbing particles are moved in a direction in which the width is narrowed, the light absorbing particles is easily moved, thereby improving efficiency of the optical path control member.

In addition, a decrease in light transmission by the accommodation part is reduced by disposing the accommodation part to be spaced apart from an electrode in a direction of a visual field surface or an electrode in a direction opposite to the direction of the visual field surface, so that brightness can be improved, thereby improving visibility of the optical path control member.

In addition, in the optical path control member according to the embodiment, a ratio of a wide width and a narrow width of the accommodation part in which the light transmittance is changed, a width ratio of the partition wall part and the accommodation part, and a height ratio of the accommodation part are controlled, thereby improving a light blocking effect and light transmittance characteristics.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switching optical path control member that drives in various modes according to application of a voltage.

Figure 1:
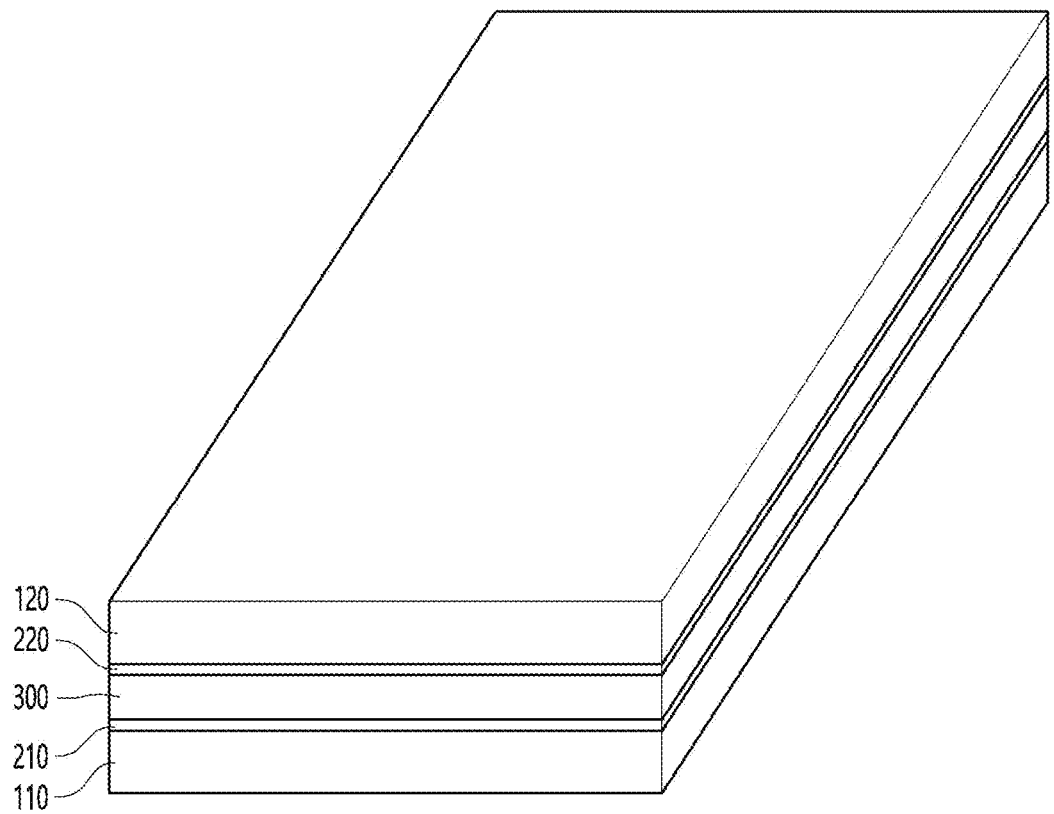
FIG. 1 is a perspective view of an optical path control member according to an embodiment.
Figure 2:
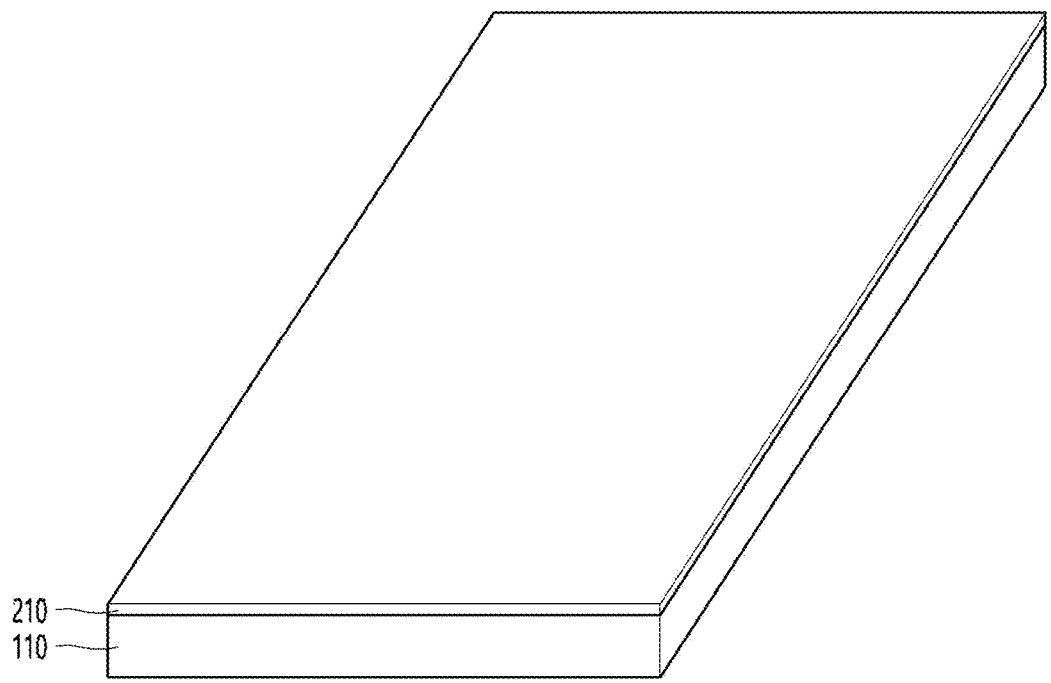
FIGS. 2 and 3 are views showing a perspective view of a first substrate and a first electrode and a perspective view of a second substrate and a second electrode of the optical path control member according to the embodiment, respectively.
Figure 3:
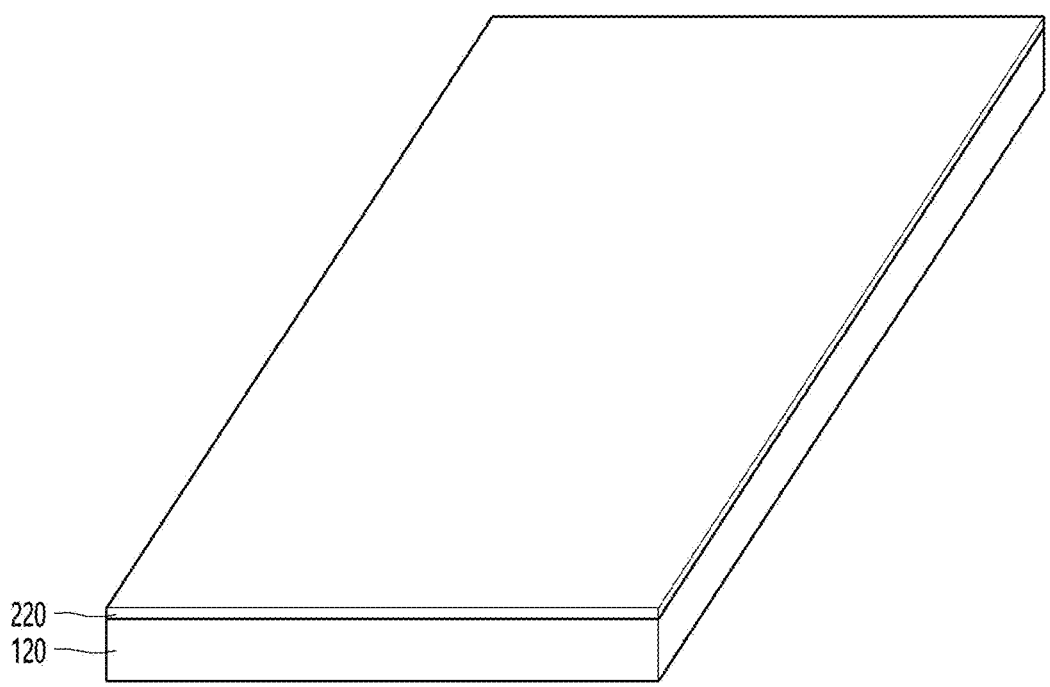

Referring to FIGS. 1 to 3, an optical path control member according to an embodiment may include a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may have a thickness of 10 μm to 100 μm.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of 0.05 μm to 2 μm.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo), gold (Au), titanium (Ti), and alloys thereof.

Alternatively, the first electrode 210 may include a plurality of conductive patterns. For example, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may have a thickness of 10 μm to 100 μm.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of 0.05 μm to 2 μm.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo), gold (Au), titanium (Ti), and alloys thereof.

Alternatively, the second electrode 220 may include a plurality of conductive patterns. For example, the second electrode 220 may include a plurality of mesh lines intersecting each other and a plurality of mesh openings formed by the mesh lines.

Accordingly, even though the second electrode 220 contains a metal, visibility may be improved because the second electrode is not visible from the outside. In addition, the light transmittance is increased by the openings, so that the brightness of the optical path control member according to the embodiment may be improved.

The light conversion unit 300 may be disposed between the first substrate 110 and the second substrate 120. In detail, the light conversion unit 300 may be disposed between the first electrode 210 and the second electrode 220.

Referring to FIGS. 4 to 7, the light conversion unit 300 may include a partition wall part 310 and an accommodation part 320.

The partition wall part 310 may be defined as a region through which light is transmitted, and the accommodation part 320 may be defined as a variable region that is variable to a light blocking part and a light transmitting part according to application of a voltage.

The partition wall part 310 and the accommodation part 320 may be alternately disposed. The partition wall part 310 and the accommodation part 320 may be disposed in different widths. For example, the width of the accommodation part 320 may be greater than the width of the accommodation part 320.

The partition wall part 310 and the accommodation part 320 may be disposed in contact with at least one of the first electrode 210 and the second electrode 220.

For example, the partition wall part 310 and the accommodation part 320 may be disposed in direct contact with the first electrode 210 and may be disposed in indirect contact with the second electrode 220. That is, an adhesive layer 400 for adhering the first substrate 110 and the second substrate 120 may be disposed on the light conversion unit 300, and the partition wall part 310 and the accommodation part 320 may be disposed in indirect contact with the second electrode 220.

Meanwhile, although not shown in the drawings, a buffer layer for improving adhesion of the light conversion unit 300 may be additionally disposed between the first electrode 210 and the light conversion unit 300.

The partition wall part 310 and the accommodation part 320 may be alternately disposed. In detail, the partition wall part 310 and the accommodation part 320 may be alternately disposed. That is, each of the partition wall parts 310 may be disposed between the accommodation parts 320 adjacent to each other, and each of the accommodation parts 320 may be disposed between the partition wall parts 310 adjacent to each other.

The partition wall part 310 may contain a transparent material. The partition wall part 310 may contain a material that may transmit light.

The partition wall part 310 may contain a resin material. For example, the partition wall part 310 may contain a photo-curable resin material. As an example, the partition wall part 310 may contain a UV resin or a transparent photoresist resin. Alternatively, the partition wall part 310 may contain urethane resin or acrylic resin.

The partition wall part 310 may transmit light incident on any one of the first substrate 110 and the second substrate 120 toward another substrate.

For example, in FIGS. 4 to 7, light may be emitted in a direction of the first substrate 110 and the light may be incident on the second substrate 120. The partition wall part 310 may transmit the light, and the transmitted light may be moved in a direction of the second substrate 120.

The accommodation part 320 may include an electrolyte 320a and light absorbing particles 320b. In detail, the accommodation part 320 is filled with the electrolyte 320a, and a plurality of light absorbing particles 320b may be dispersed in the electrolyte 320a.

The electrolyte 320a may be a material for dispersing the light absorbing particles 320b. The electrolyte 320a may contain a transparent material. The electrolyte 320a may contain a paraffinic solvent. In addition, the electrolyte 320a may contain a material capable of transmitting light.

The light absorbing particles 320b may be disposed to be dispersed in the electrolyte 320a. In detail, the plurality of light absorbing particles 320b may be disposed to be spaced apart from each other in the electrolyte 320a.

The light absorbing particles 320b may have a color. For example, the light absorbing particles 320b may have black light absorbing particles. As an example, the light absorbing particles 320b may include carbon black.

The light absorbing particles 320b may be formed in a spherical shape. The light absorbing particles 320b may have a diameter of several nanometers.

The light transmittance of the accommodation part 320 may be changed by the light absorbing particles 320b. In detail, the accommodation part 320 may be changed into the light blocking part and the light transmitting part by changing the light transmittance due to the movement of the light absorbing particles 320b.

For example, the optical path control member according to the embodiment may be changed from a first mode to a second mode or from the second mode to the first mode by a voltage applied to the first electrode 210 and the second electrode 220.

In detail, in the optical path control member according to the embodiment, the accommodation part 320 becomes the light blocking part in the first mode, and light of a specific angle may be blocked by the accommodation part 320. That is, a viewing angle of the user viewing from the outside may be narrowed.

In addition, in the optical path control member according to the embodiment, the accommodation part 320 becomes the light transmitting part in the second mode, and in the optical path control member according to the embodiment, light may be transmitted through both the partition wall part 310 and the accommodation part 320. That is, the viewing angle of the user viewing from the outside may be widened.

Switching from the first mode to the second mode, that is, the conversion of the accommodation part 320 from the light blocking part to the light transmitting part may be realized by movement of the light absorbing particles 320b of the accommodation part 320.

In detail, the accommodation part 320 may be electrically connected to the first electrode 210 and the second electrode 220.

In this case, when a voltage is not applied to the optical path control member from the outside, the light absorbing particles 320b of the accommodation part 320 are uniformly dispersed in the electrolyte 320a, and light may be blocked by the light absorbing particles in the accommodation part 320. Accordingly, in the first mode, the accommodation part 320 may be driven as the light blocking part.

Alternatively, when a voltage is applied to the optical path control member from the outside, the light absorbing particles 320b may move. For example, the light absorbing particles 320b may move toward one end or the other end of the accommodation part 320 by a voltage transmitted through the first electrode 210 and the second electrode 220.

As a method of moving the light absorbing particles, first, the light absorbing particles including the carbon black may be charged. For example, micelles may be formed and a charging effect may be created by charging the light absorbing particles themselves including the carbon black with a negative charge or chemically introducing a functional group similar to a surfactant to a surface of the light absorbing particles including the carbon black to charge the light absorbing particles.

Subsequently, when a voltage is applied to the first electrode 210 and/or the second electrode 220, an electric field is formed between the first electrode 210 and the second electrode 220, and the charged light absorbing particles including the carbon black may be moved toward a positive electrode of the first electrode 210 and the second electrode 220 using the electrolyte 320a as a medium.

Figure 5:
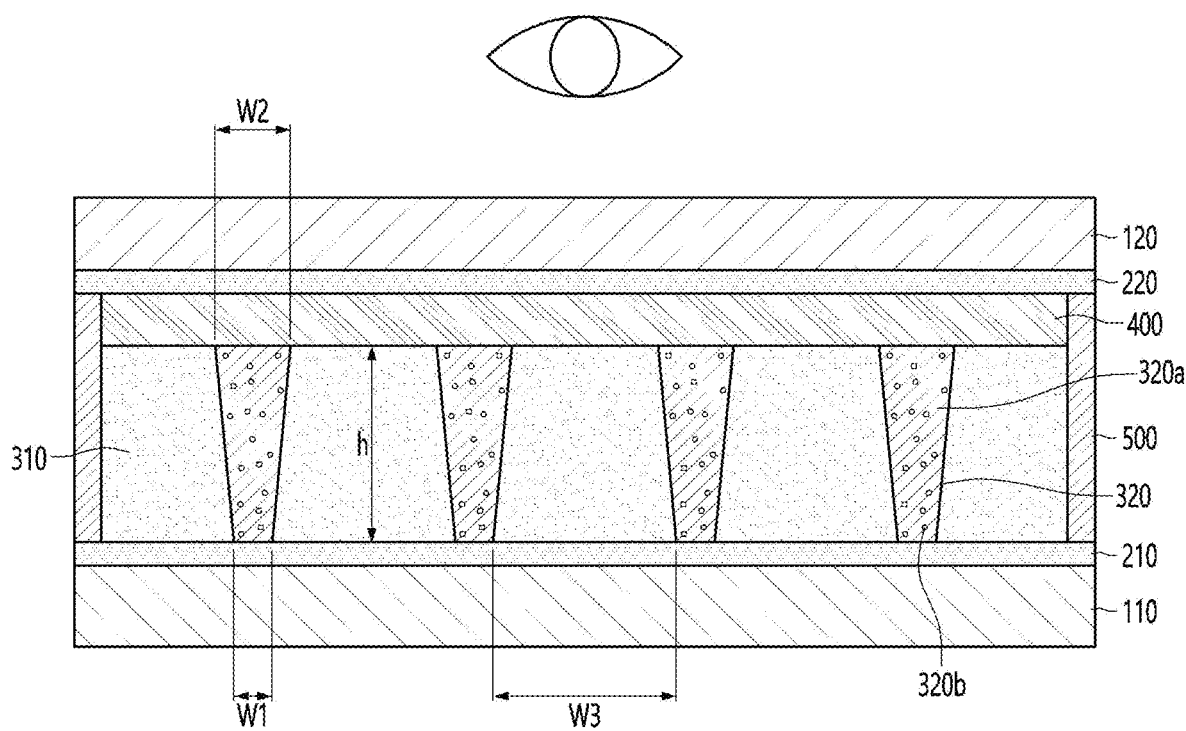
Figure 7:
Figure 7:
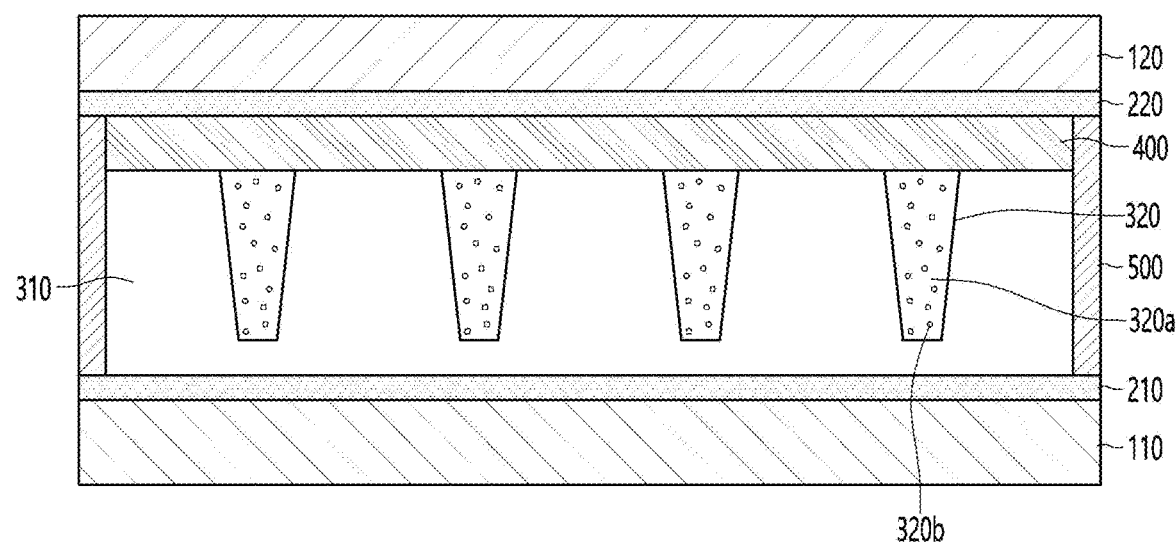

That is, when the voltage is not applied to the first electrode 210 and/or the second electrode 220, as shown in FIGS. 5 and 7, the light absorbing particles 320b may be uniformly dispersed in the electrolyte 320a to drive the accommodation part 320 as the light blocking part.

Figure 4:
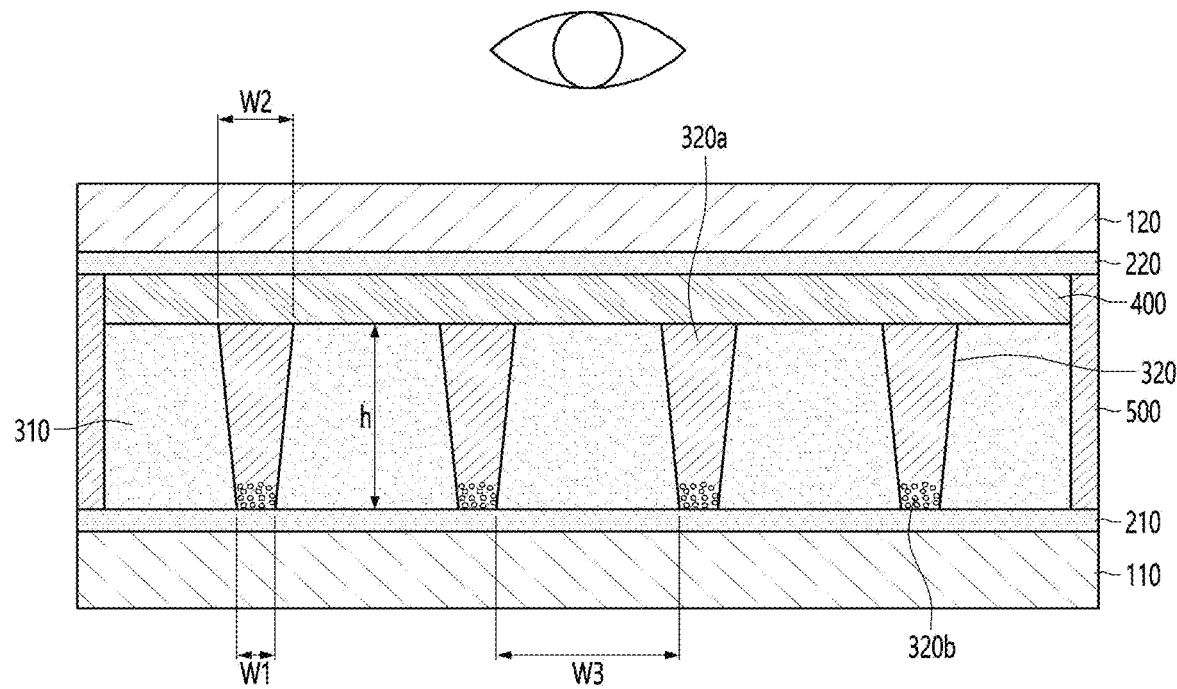
FIGS. 4 to 7 are views showing various cross-sectional views of the optical path control member according to the embodiment.
Figure 6:
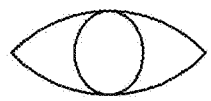
Figure 6:
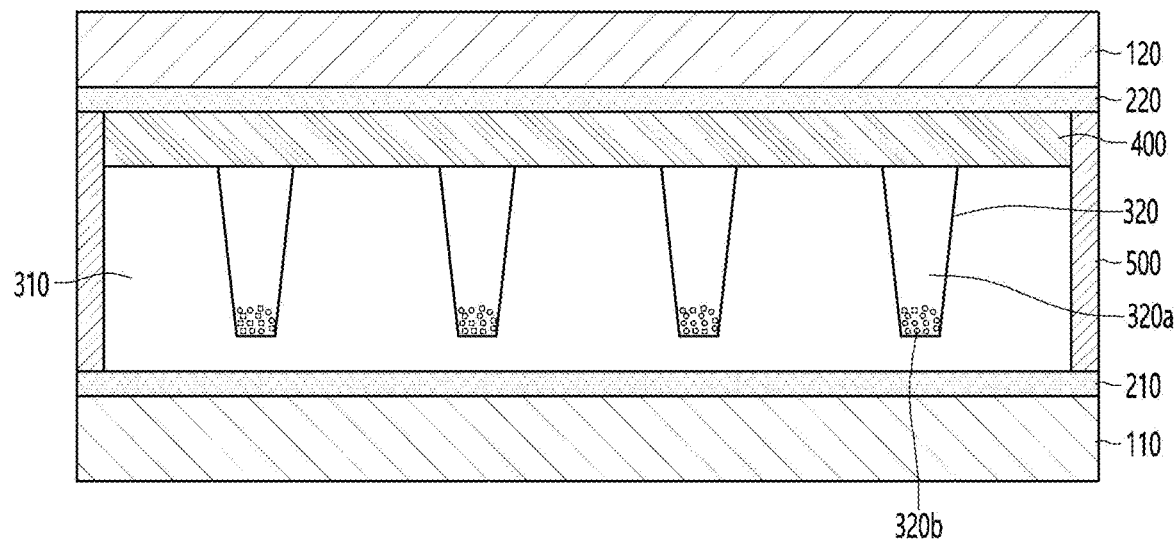

In addition, when the voltage is applied to the first electrode 210 and/or the second electrode 220, as shown in FIGS. 4 and 6, the light absorbing particles 320b may be moved toward the second electrode 220 in the electrolyte 320a. That is, the light absorbing particles 320b are moved in one direction, and the accommodation part 320 may be driven as the light transmitting part.

Accordingly, the optical path control member according to the embodiment may be driven in two modes according to a user's surrounding environment. That is, when the user requires light transmission only at a specific viewing angle, the accommodation part is driven as the light blocking part, or in an environment in which the user requires high brightness, a voltage may be applied to drive the accommodation part as the light transmitting part.

Therefore, since the optical path control member according to the embodiment may be implemented in two modes according to the user's requirement, the optical path control member may be applied regardless of the user's environment.

Meanwhile, referring to FIG. 4, in the optical path control member according to the embodiment, a width and height of the partition wall part and the accommodation part may be controlled in order to improve a light blocking effect in the first mode and a light transmitting effect in the second mode.

In detail, a first width w1 defined as a narrow width and a second width w2 defined as a wide width may be defined in the accommodation part 320, and a third width w3 defined as a wide width may be defined in the partition wall part 310. In addition, a height h defined as the height of the partition wall part 310 or the accommodation part 320 may be defined.

In FIG. 4, a long-width direction of the accommodation part is defined as a visual field surface, but the embodiment is not limited thereto, and a short-width direction of the accommodation part may be defined as the visual field surface.

Hereinafter, for convenience of description, it will be described based on a case in which the long-width direction of the accommodation part is defined as the visual field surface.

In this case, a ratio w2/w1 of the second width w2 to the first width w1 may be 1.8 or less. When the ratio w2/w1 of the second width w2 to the first width w1 exceeds 1.8, light blocking efficiency in the first mode and light transmitting efficiency in the second mode may be deteriorated.

In detail, when the ratio w2/w1 of the second width w2 to the first width w1 exceeds 1.8, an inclination angle of the accommodating part 320 becomes large, and thus light at an undesired angle in the first mode may be blocked, and an amount of light transmission may be decreased due to an increase in the inclination angle in the second mode, so that a front brightness may be decreased.

In addition, a ratio w3/w1 of the third width w3 to the first width w1 may be 1.5 or more. When the ratio w3/w1 of the third width w3 to the first width w1 is less than 1.5, the light blocking efficiency in the first mode and the light transmitting efficiency in the second mode may be deteriorated.

In detail, when the ratio w3/w1 of the third width w3 to the first width w1 is less than 1.5, the amount of light transmission in the second mode is decreased due to a decrease in a region through which light is transmitted, so that the front brightness may be decreased.

In addition, a ratio h/w1 of the height h of the partition wall part 310 or the accommodation part 320 to the first width w1 may be 4 or more. When the ratio h/w1 of the height h of the partition wall part 310 or the accommodation part 320 to the first width w1 is less than 4, the light blocking efficiency in the first mode and the light transmitting efficiency in the second mode may be deteriorated.

In detail, when the ratio h/w1 of the height h of the partition wall part 310 or the accommodation part 320 to the first width w1 is less than 4, light at an undesired angle in the first mode may be blocked due to the height of the accommodation part, and an amount of light transmission is decreased due to an increase in a blocking region in the second mode, so that the front brightness may be decreased.

Meanwhile, the accommodation part 320 may be formed in various shapes.

Alternatively, referring to FIGS. 4 and 5, a width of the accommodation part 320 may be changed while the accommodation part 320 extends from one end of the accommodation part 320 to the other end thereof.

For example, referring to FIGS. 4 and 5, the accommodation part 320 may be formed in a trapezoidal shape. In detail, the accommodation part 320 may be formed so that the width of the accommodation part 320 is widened while extending from the first electrode 210 toward the second electrode 220.

Alternatively, the width of the accommodation part 320 may be narrower while the accommodation part 320 extends from a visual field surface of the user toward an opposite surface thereof. In addition, when a voltage is applied to the light conversion unit, the light absorbing particles of the accommodation part 320 may be moved in a direction in which the width of the accommodation part is narrowed.

That is, the width of the of the accommodation part 320 may be widened while the accommodation part 320 extends from a light incident part in which light is incident toward a light emitting part in which light is emitted.

That is, the light absorbing particles of the accommodation part 320 may be moved toward the first electrode 210.

Accordingly, since the light absorbing particles are moved toward the opposite surface of the visual field surface instead of the visual field surface, it is possible to inhibit blocking of light emitted toward the visual field surface, thereby improving the brightness of the optical path control member.

In addition, since the light absorbing particles are moved from a wide region toward a narrow region, the light absorbing particles may be easily moved.

In addition, since the light absorbing particles move to the narrow region of the accommodation part, an amount of light transmitted toward the visual field surface of the user is increased, thereby improving the front brightness.

Or, conversely, the accommodation part 320 may be formed so that the width of the accommodation part 320 is narrowed while extending from the first electrode 210 toward the second electrode 220.

That is, the width of the accommodation part 320 may be widened while the accommodation part 320 extends from the visual field surface of the user toward the opposite surface thereof. In addition, when a voltage is applied to the light transmitting part, the light absorbing particles of the accommodation part 320 may be moved in a direction in which the width of the accommodation part is widened.

That is, the width of the of the accommodation part 320 may be narrowed while the accommodation part 320 extends from the light incident part in which the light is incident toward the light emitting part in which the light is emitted.

That is, the light absorbing particles of the of the accommodation part 320 may be moved toward the first electrode 210.

Accordingly, a contact region between the first electrode and one surface of the accommodation part through which the light absorbing particles move is increased, so that a moving speed of the light absorbing particles, that is, a driving speed may be increased.

Meanwhile, the accommodation part 320 may be disposed to be spaced apart from the first electrode 210 or the second electrode 220. That is, the accommodation part 320 may be disposed in contact with only one of the first electrode 210 and the second electrode 220.

For example, referring to FIGS. 6 and 7, a material which is the same as or similar to that of the partition wall part 310 may be disposed in a region where the accommodation part 320 and the first electrode 210 are spaced apart from each other. That is, in the light conversion unit 300, a base part may be formed between the accommodation part 320 and the adhesive layer 400.

In detail, the accommodation part 320 may be disposed to be spaced apart from the first electrode.

Accordingly, the brightness of the optical path control member may be improved by increasing the transmittance of light emitted in the direction of the visual field surface, thereby improving visibility.

An optical path control member according to an embodiment may include a light transmitting part in which light transmittance is changed according to application of a voltage.

That is, when a voltage is applied, the light transmitting part of the optical path control member according to the embodiment may be driven as a light blocking part, and when a voltage is applied, the light transmitting part may be driven as a light transmitting part.

Accordingly, the optical path control member according to the embodiment may be applied in various ways according to a user's usage environment.

In addition, a width of the light transmitting part may be widened while the light transmitting part of the optical path control member according to the embodiment extends from a light incident part toward a light emitting part. Further, when the voltage is applied, since light absorbing particles are moved in a direction in which the width is narrowed, the light absorbing particles can be easily moved, thereby improving efficiency of the optical path control member.

In addition, a decrease in light transmission by the light transmitting part is reduced by disposing the light transmitting part to be spaced apart from an electrode in a direction of a visual field surface or an electrode in a direction opposite to the direction of the visual field surface, so that brightness may be improved, thereby improving visibility of the optical path control member.

In addition, in the optical path control member according to the embodiment, a ratio of a wide width to a narrow width of the light transmitting part in which the light transmittance is changed, a width ratio of the partition wall part and the light transmitting part, and a height ratio of the light transmitting part are controlled, thereby improving the light blocking effect and light transmittance characteristics.

Hereinafter, a method of manufacturing an optical path control member according to an embodiment will be described with reference to FIGS. 8 to 15.

Figure 8:
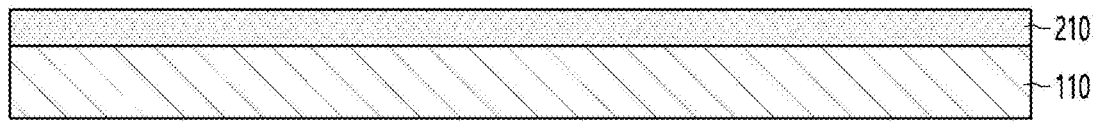
FIGS. 8 and 15 are views for describing a method of manufacturing an optical path control member according to an embodiment.

First, referring to FIG. 8, an electrode material forming a first substrate 110 and a first electrode is prepared. Subsequently, the electrode material may be formed on one surface of the first substrate 110 by a coating or deposition process. In detail, the electrode material may be formed on the entire surface of the first substrate 110. Accordingly, a first electrode 210 formed as a surface electrode may be formed on the first substrate 110.

Figure 9:
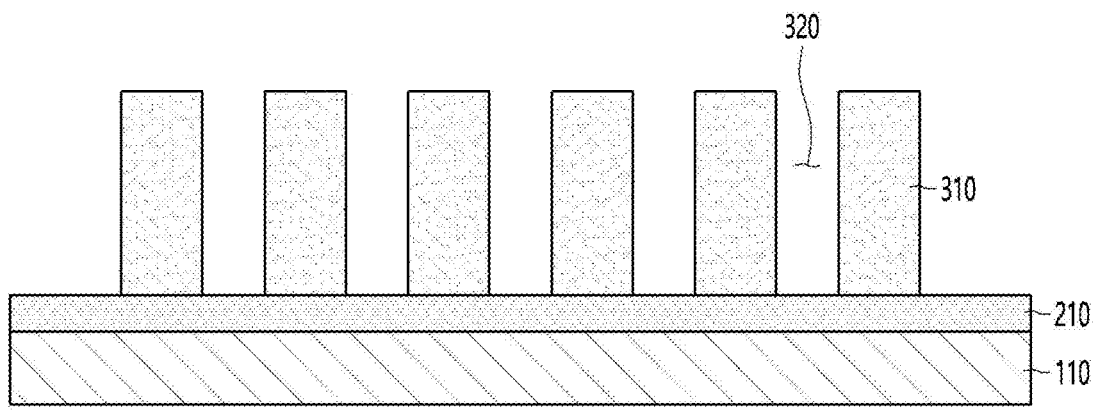

Subsequently, referring to FIG. 9, a resin layer may be formed by applying a resin material on the first electrode 210. In detail, the resin layer may be formed by applying a urethane resin or an acrylic resin on the first electrode 210.

Subsequently, a pattern part may be formed on the resin layer using a mold. In detail, holes or grooves are formed in the resin layer by imprinting the mold, and accordingly, a partition wall part may be formed by the remaining resin layer. That is, the partition wall part 310 and the accommodation part 320 described above may be formed on the resin layer.

Figure 10:

Subsequently, referring to FIG. 10, an electrode material forming a second substrate 120 and a second electrode is prepared. Subsequently, the electrode material may be formed on one surface of the second substrate 120 by a coating or deposition process. In detail, the electrode material may be formed on the entire surface of the second substrate 120. Accordingly, a second electrode 220 formed as a surface electrode may be formed on the second substrate 120.

Figure 11:
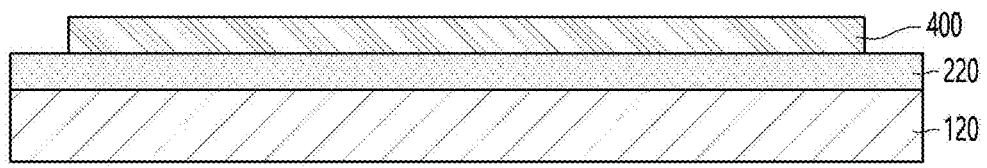

Subsequently, referring to FIG. 11, an adhesive layer 400 may be formed by applying an adhesive material on the second electrode 220. The adhesive layer 400 may be formed on a partial region of the second electrode 220.

Figure 12:
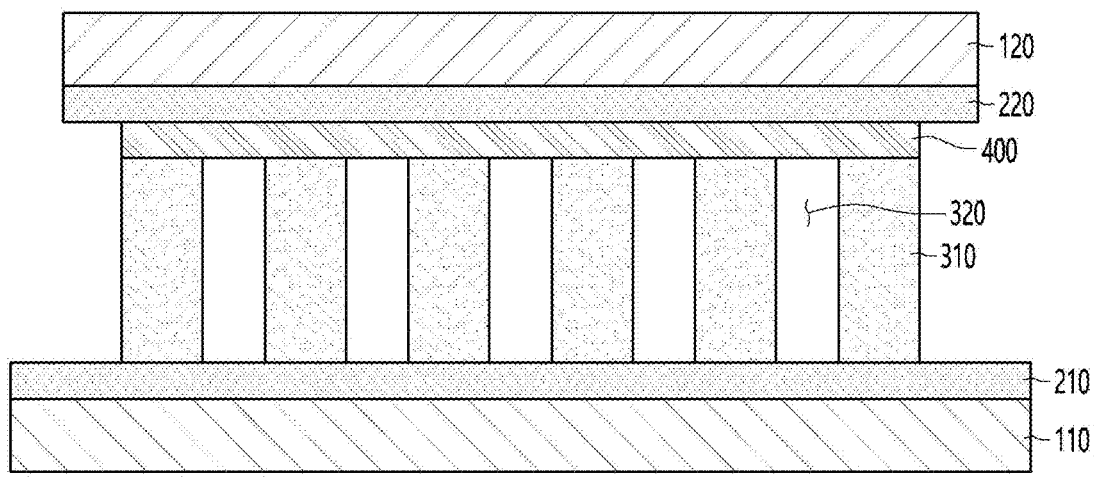
Figure 12:
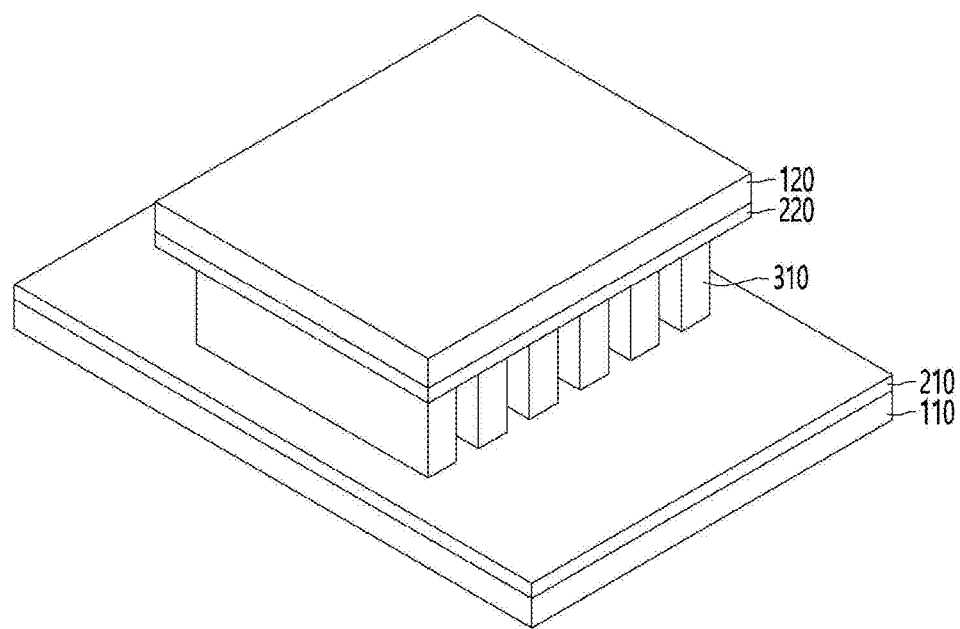

Subsequently, referring to FIG. 12, the first substrate 110 and the second substrate 120 manufactured in advance may be adhered. In detail, the first substrate 110 and the second substrate 120 may be adhered to each other through the adhesive layer 400 on the second substrate 120.

In this case, the first substrate 110 and the second substrate 120 may be adhered in different directions. In detail, the first substrate 110 and the second substrate 120 may be adhered to each other so that a long side direction of the first substrate 110 and a short side direction of the second substrate 120 overlap each other.

Accordingly, first and second connection electrodes connected to an external printed circuit board may be formed on surfaces exposed from the first substrate 110 and the second substrate 120.

Figure 13:
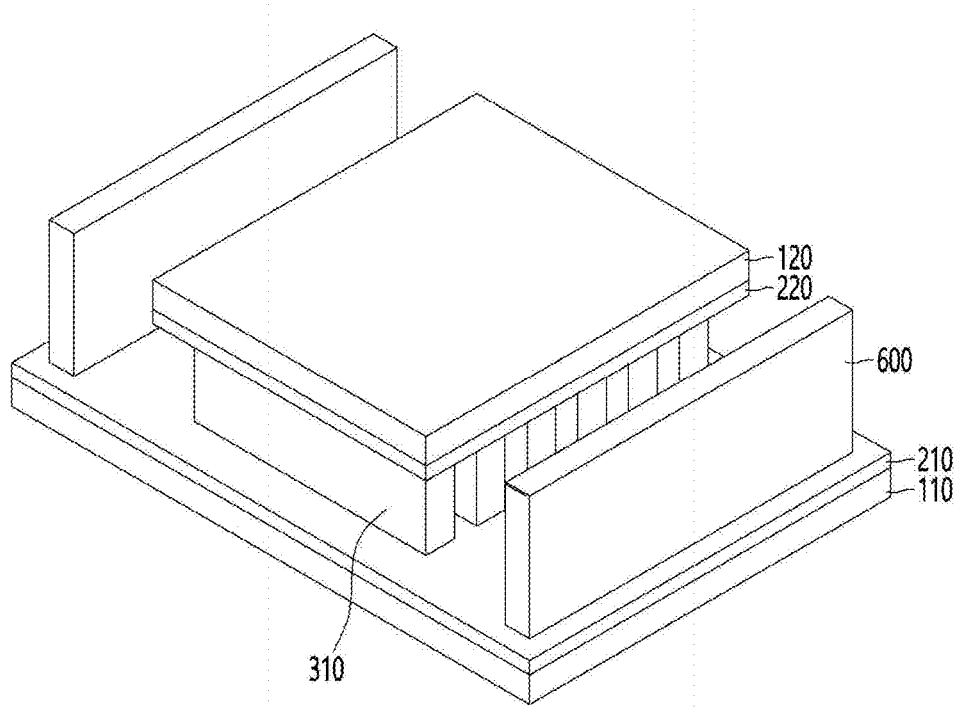

Subsequently, referring to FIG. 13, a dam part 600 may be formed on the first substrate 110. In detail, the dam part 600 may be disposed above and below the accommodation part 320 disposed on the first substrate 110. That is, the dam part 600 may be disposed so that the accommodation part 320 is disposed between the dam parts 600.

Figure 14:
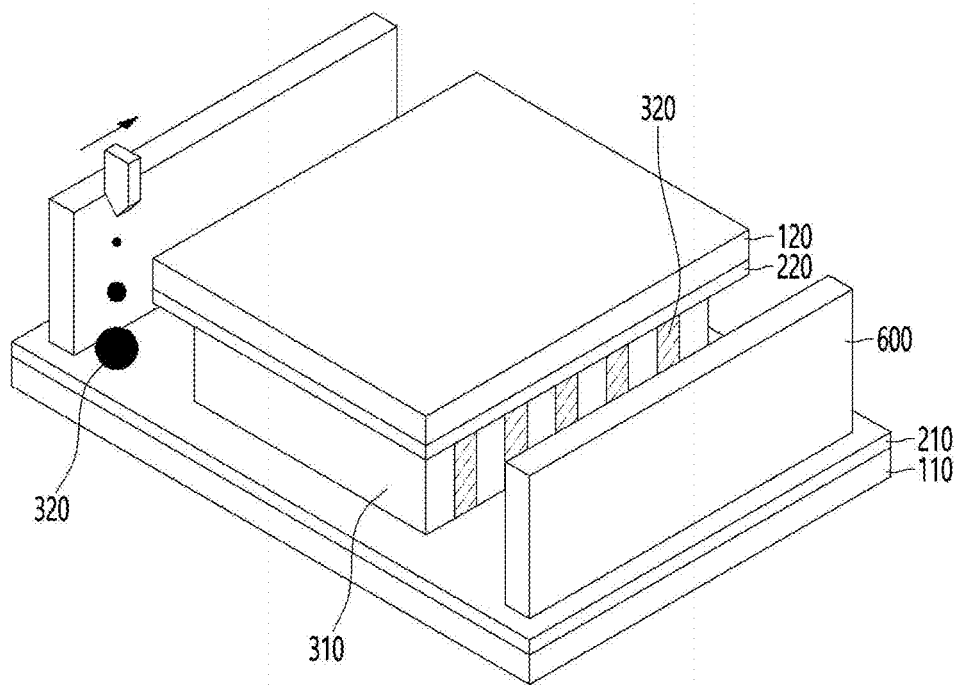

Subsequently, referring to FIG. 14, a light conversion material may be injected between the accommodation part 320, that is, the partition wall parts 310. In detail, a light conversion material in which light absorbing particles such as carbon black or the like are dispersed in an electrolyte solvent containing a paraffinic solvent may be injected between the accommodation part 320, that is, between the partition wall parts. Accordingly, the partition wall part 310 described above may be formed between the accommodation parts 320.

Figure 15:
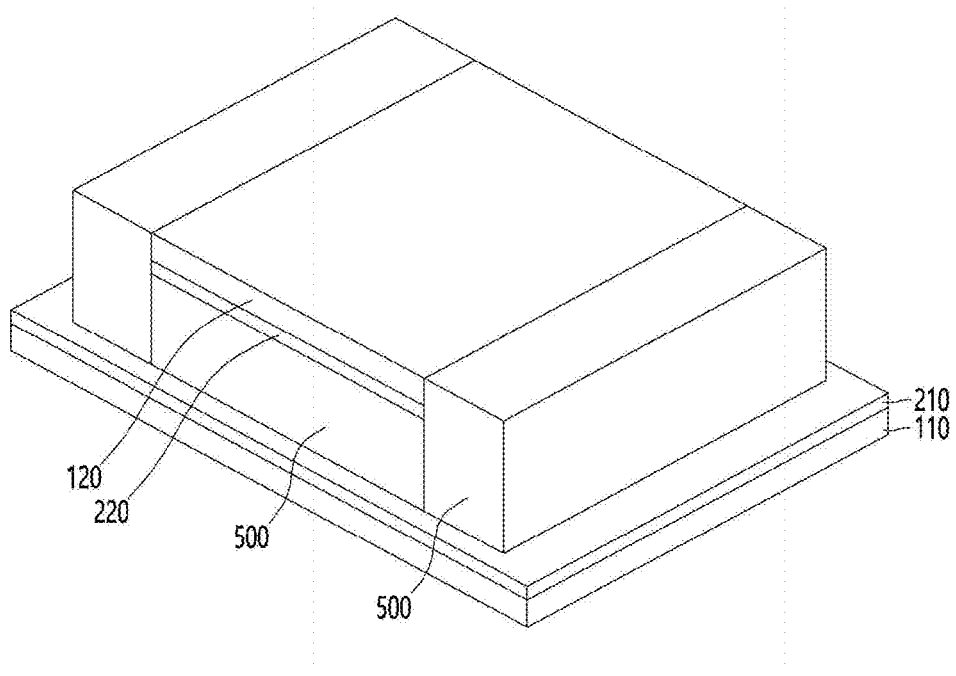

Subsequently, referring to FIG. 15, the light conversion material inside the accommodation part may be sealed from the outside by forming a sealing part 500 in the lateral direction of the accommodation part 320. Subsequently, a final optical path control member may be formed by cutting the first substrate 110.

Hereinafter, referring to FIGS. 16 to 18, a display device and a display apparatus to which an optical path control member according to an embodiment is applied will be described.

Figure 16:
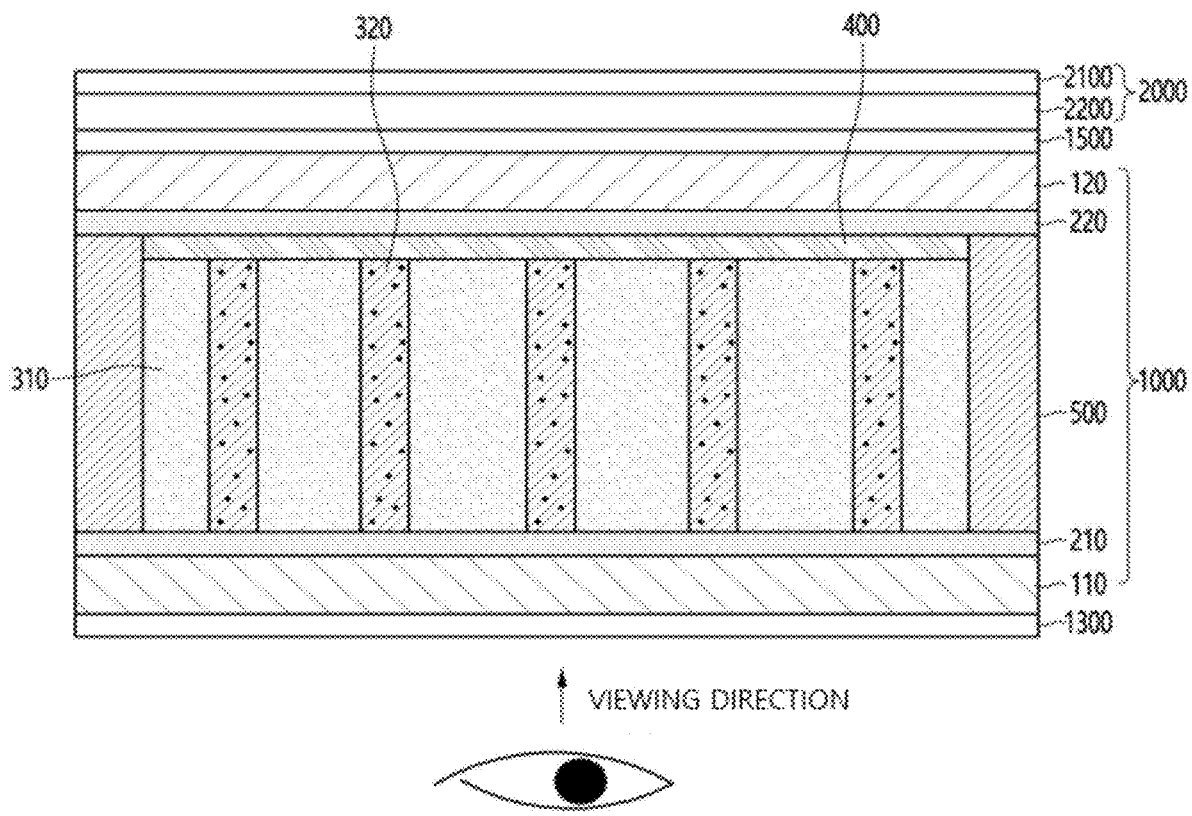
FIG. 16 is a cross-sectional view of a display device to which an optical path control member according to an embodiment is applied.

Referring to FIG. 16, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the optical path control member and the display panel, the optical path control member and the display panel may be adhered after the release film is removed.

The display panel 2000 may include a first' substrate 2100 and a second' substrate 2200. When the display panel 2000 is a liquid crystal display panel, the display panel 2000 may be formed in a structure in which the first' substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit providing light from a rear surface of the display panel 2000.

That is, when the display panel 2000 includes the liquid crystal display panel, the optical path control member may be disposed between the backlight unit and the liquid crystal display panel.

Alternatively, when the display panel 2000 is an organic electroluminescence display panel, the display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. Further, the second' substrate 2200 configured to function as an encapsulation substrate for encapsulation may further be included on the organic light emitting element.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic electroluminescence display panel, the polarizing plate may be the external light reflection preventive polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

Although it is shown in the drawings that the optical path control member is disposed at an upper portion of the display panel, but the embodiment is not limited thereto, and the optical path control member may be disposed at various positions such as a position in which light is adjustable, that is, a lower portion of the display panel, between a second substrate and a first substrate of the display panel, or the like.

Figure 17:
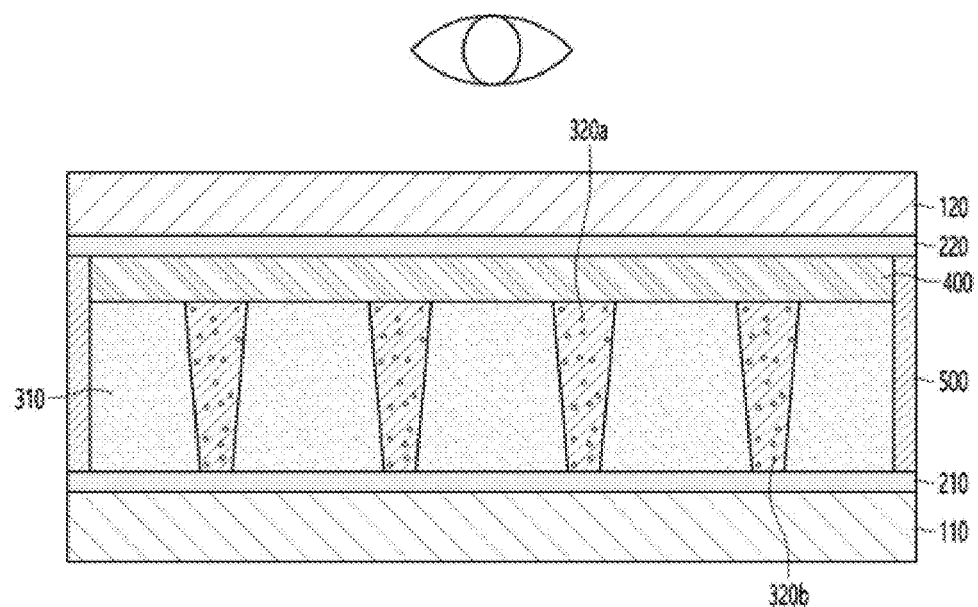
FIGS. 17 and 18 are views for describing one embodiment of the display device to which the optical path control member according to the embodiment is applied.
Figure 17:
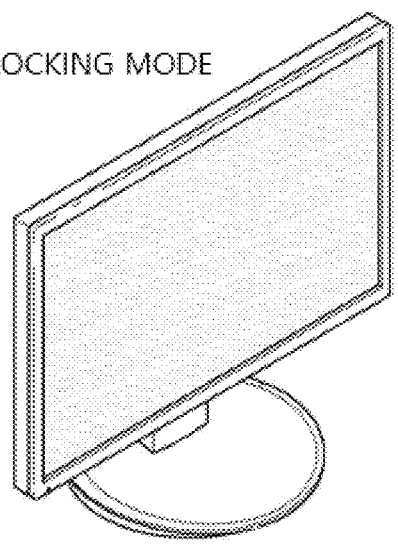
Figure 18:
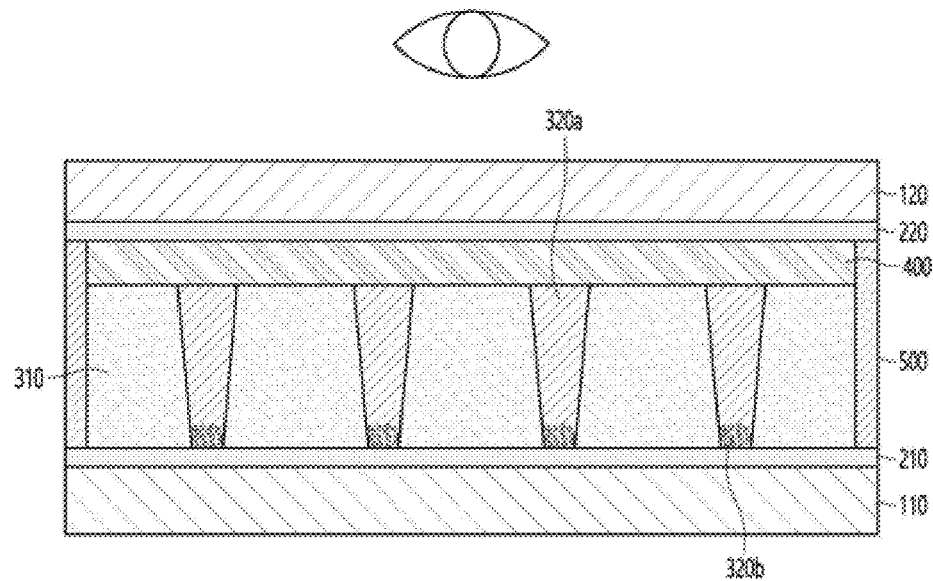
Figure 18:
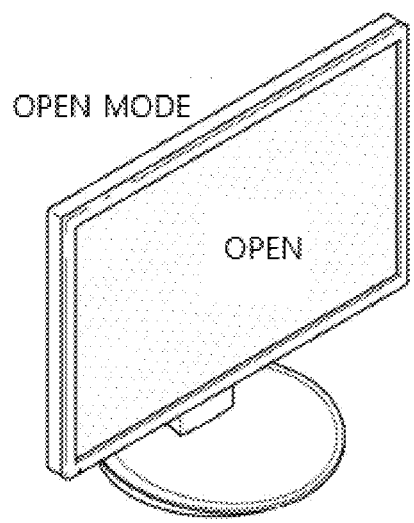

Referring to FIGS. 17 and 18, the optical path control member according to the embodiment may be applied to a vehicle.

Referring to FIGS. 17 and 18, the optical path control member according to the embodiment may be applied to a display device that displays a display.

For example, when power is not applied to the optical path control member as shown in FIG. 17, the accommodation part functions as the light blocking part, so that the display device is driven in a light blocking mode, and when power is applied to the optical path control member as shown in FIG. 18, the accommodation part functions as the light transmitting part, so that the display device may be driven in an open mode.

Accordingly, a user may easily drive the display device in a privacy mode or a normal mode according to application of power.

In addition, although not shown in the drawings, the display device to which the optical path control member according to the embodiment is applied may also be applied inside the vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Furthermore, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
   a first substrate;
   a first electrode disposed on the first substrate;
   a second substrate disposed on the first substrate;
   a second electrode disposed under the second substrate; and
   a light conversion unit disposed between the first electrode and the second electrode,
   wherein the light conversion unit includes a partition wall part and an accommodation part alternately disposed,
   wherein the accommodation part changes light transmittance according to application of a voltage,
   wherein a width of the accommodation part in a horizontal direction changes along a thickness direction of the first substrate,
   wherein a width of the partition wall part in the horizontal direction changes along the thickness direction of the first substrate,
   wherein the accommodation part has a first width of a narrowest region of the accommodation part and a second width of a widest region of the accommodation part,
   wherein the partition wall part has a third width of a widest region of the partition wall part,
   wherein the third width of the partition wall part is greater than the second width of the accommodation part, and
   wherein a ratio of the second width to the first width is 1.8 or less.

2. The optical path control member of claim 1, wherein a ratio of the third width to the first width is 1.5 or more.

3. The optical path control member of claim 1, wherein a ratio of a height in the thickness direction of the accommodation part or the partition wall part to the first width is 4 or greater than 4.

4. The optical path control member of claim 1, wherein the partition wall part has a fourth width of a narrowest region of the partition wall part, and
   wherein the fourth width of the partition wall part is greater than the first width of the accommodation part.

5. The optical path control member of claim 1, wherein the accommodation part includes:
   an electrolyte; and
   a plurality of light absorbing particles dispersed in the electrolyte.

6. The optical path control member of claim 5, wherein when the voltage is applied to the accommodation part, the light absorbing particles move in a direction of the first electrode or the second electrode within the accommodation part.

7. The optical path control member of claim 1, wherein a first end and a second end of the accommodation part are disposed in contact with the first electrode and the second electrode, respectively.

8. The optical path control member of claim 1, wherein at least one of a first end and a second end of the accommodation part is disposed to be spaced apart from the first electrode and the second electrode.

9. The optical path control member of claim 1, further comprising an adhesive layer disposed between the light conversion unit and the second electrode.

10. A display device comprising:
   a display panel; and
   the optical path control member of claim 1 disposed on or under the display panel.

11. The optical path control member of claim 1, wherein the ratio of the second width to the first width is 1.2 to 1.8.

12. The optical path control member of claim 1, wherein the ratio of the second width to the first width is 1.5 to 1.8.

13. The optical path control member of claim 4, wherein the fourth width of the partition wall part is greater than the second width of the accommodation part.

14. The optical path control member of claim 2, wherein a ratio of the height to the first width is 4 or greater than 4.

* * * * *